(12) United States Patent
Feng et al.

(10) Patent No.: US 8,297,764 B2
(45) Date of Patent: Oct. 30, 2012

(54) REFLECTIVE SHEET HAVING FIRST REFLECTIVE LAYER AND SECOND REFLECTIVE LAYER

(75) Inventors: Hua-Te Feng, Hsin-Chu (TW); Ping-Feng Hwang, Hsin-Chu (TW); Lin-Chu Weng, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 408 days.

(21) Appl. No.: 12/547,037

(22) Filed: Aug. 25, 2009

(65) Prior Publication Data
US 2010/0061083 A1   Mar. 11, 2010

(30) Foreign Application Priority Data
Sep. 9, 2008  (TW) ............................. 97134506 A

(51) Int. Cl.
*G02B 5/08*   (2006.01)
*G02B 7/182*  (2006.01)
(52) U.S. Cl. ......................... 359/883; 359/871
(58) Field of Classification Search .................. 359/883
See application file for complete search history.

(56) References Cited

U.S. PATENT DOCUMENTS

| | | | | |
|---|---|---|---|---|
| 5,991,080 | A * | 11/1999 | Kohta et al. | 359/584 |
| 6,117,530 | A |  9/2000 | Jonza et al. | |
| 6,914,719 | B2 * |  7/2005 | Koyama et al. | 359/361 |
| 6,943,855 | B2 |  9/2005 | Nakano | |
| 7,141,297 | B2 * | 11/2006 | Condo et al. | 428/212 |
| 2007/0054089 | A1 |  3/2007 | Watanabe et al. | |

FOREIGN PATENT DOCUMENTS

| CN | 1672067 A | 9/2005 |
|---|---|---|
| TW | M337748 | 8/2008 |

* cited by examiner

*Primary Examiner* — Jade R Chwasz
(74) *Attorney, Agent, or Firm* — Muncy, Geissler, Olds & Lowe, PLLC

(57) ABSTRACT

A reflective sheet includes a first reflective layer and a second reflective layer. The first reflective layer has a first index of refraction, and the second reflective layer has a second index of refraction. The first reflective layer and the second reflective layer are in contact with each other to form a contact interface, and the first index of refraction is different from the second index of refraction so as to make the contact interface be a reflective surface. A top surface of the first reflective layer opposite the contact interface serves as a light incident surface for the reflective sheet, the reflectance of the first reflective layer is larger than the reflectance of the second reflective layer, and the mechanical strength of the second reflective layer is larger than the mechanical strength of the first reflective layer.

11 Claims, 5 Drawing Sheets

REFLECTIVE SHEET HAVING FIRST REFLECTIVE LAYER AND SECOND REFLECTIVE LAYER

CROSS REFERENCE TO RELATED APPLICATION

This application claims priority of application No. 097134506 filed in Taiwan R.O.C on Sep. 9, 2008 under 35 U.S.C. §119; the entire contents of which are hereby incorporated by reference.

BACKGROUND OF THE INVENTION

1. Field of the Invention

The invention relates to an optical sheet, particularly to a reflective sheet.

2. Description of the Related Art

FIG. 1 shows a schematic diagram illustrating a conventional reflective sheet. Referring to FIG. 1, the reflective sheet 100 is made from foamed polyethylene terephthalate (PET) 102, so multiple flat and densely spread bubbles 104 are formed in the reflective sheet 100. When light beams enter the reflective sheet 100, the light beams are additionally reflected by the interface between the bubbles 104 and the polyethylene terephthalate 102 to increase the overall reflectance of the reflective sheet 100. FIG. 2 shows a schematic diagram illustrating another conventional reflective sheet. Referring to FIG. 2, the reflective sheet 200 is made from polyethylene terephthalate (PET) 202 with reflective particles 204. The reflective particles 204 may be made from titanium dioxide ($TiO_2$) or barium sulfate ($BaSO_4$). When light beams enter the reflective sheet 200, the light beams are additionally reflected by the reflective particles 204 to increase the overall reflectance of the reflective sheet 200.

However, the conventional reflective sheets 100 and 200 are made from expensive polyethylene terephthalate and are each formed as a single-layer structure, and the single-layer structure is liable to warp or waving when brought to a standstill or heated to affect the optical performance. Hence, a material with high mechanical strength is selected for the reflective sheet to avoid the wrap or waving of the reflective sheet. However, the material with high mechanical strength is naturally hard. When a light guide plate 300 shown in FIG. 3A is stacked on the convention reflective sheet 100 or reflective sheet 200 to form a backlight module, light-scattering dots 302 formed on the light guide plate 300 and made from printed ink are liable to be injured or peeled off due to the squeeze given by the hard reflective sheet 100 or reflective sheet 200, as shown in an enlarged diagram of FIG. 3B, and dot patterns are also liable to be transferred to the reflective sheet 100 or the reflective sheet 200.

BRIEF SUMMARY OF THE INVENTION

The invention provides a reflective sheet, the reflective sheet may at least overcome one of the disadvantages of conventional designs and has good reflectance and reduced fabrication costs.

According to an embodiment of the invention, a reflective sheet includes a first reflective layer and a second reflective layer. The first reflective layer has a first index of refraction, and the second reflective layer has a second index of refraction. The first reflective layer and the second reflective layer are in contact with each other to form a contact interface, and the first index of refraction is different from the second index of refraction so as to make the contact interface be a reflective surface. A top surface of the first reflective layer opposite the contact interface serves as a light incident surface for the reflective sheet, the reflectance of the first reflective layer is larger than the reflectance of the second reflective layer, and the mechanical strength of the second reflective layer is larger than the mechanical strength of the first reflective layer.

In one embodiment, the first reflective layer and the second reflective layer are formed by extrusion molding, and a plurality of reflective particles are added to the first reflective layer and the second reflective layer.

In one embodiment, the first reflective layer includes polypropylene and the second reflective layer includes polycarbonate.

In one embodiment, the second reflective layer includes opaque materials or aluminum foil.

According to another embodiment of the invention, a reflective sheet adapted to a backlight module having a light guide plate includes a first reflective layer and a second reflective layer. The first reflective layer and the second reflective layer are made from different materials and in contact with each other to form a contact interface, the contact interface is a reflective surface. A top surface of the first reflective layer opposite the contact interface contacts a plurality of light-scattering dots of the light guide plate. The reflectance of the first reflective layer is larger than the reflectance of the second reflective layer, and the mechanical strength of the second reflective layer is larger than the mechanical strength of the first reflective layer.

According to the above embodiments, since two reflective layers having different indexes of refraction or made from different materials are combined to form a reflective sheet, an additional reflective interface is provided to increase the overall reflectance of the reflective sheet. Besides, the reflective sheet is allowed to provide specific effects, such as reducing fabrication costs or enhancing heat dissipation, according to the choice of fabricated materials for different layers. Further, the disadvantages in a conventional design, such as warp or waving of a reflective sheet and damages on light-scattering dots, are overcome by the above embodiments.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
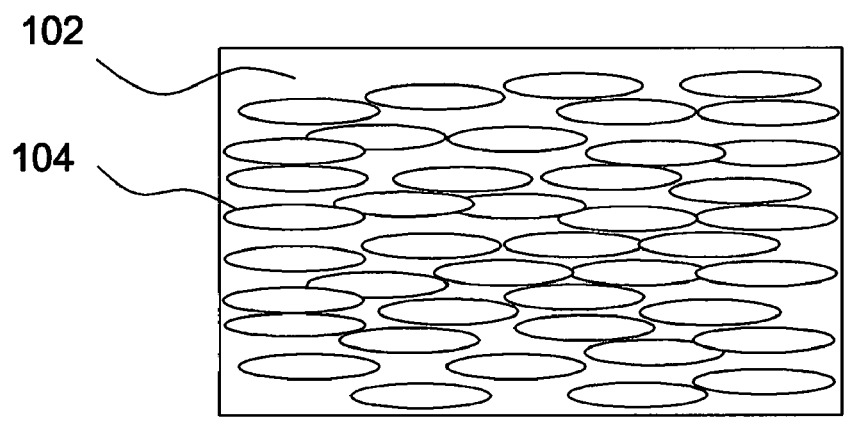
FIG. 1 shows a schematic diagram illustrating a conventional reflective sheet.
Figure 2:
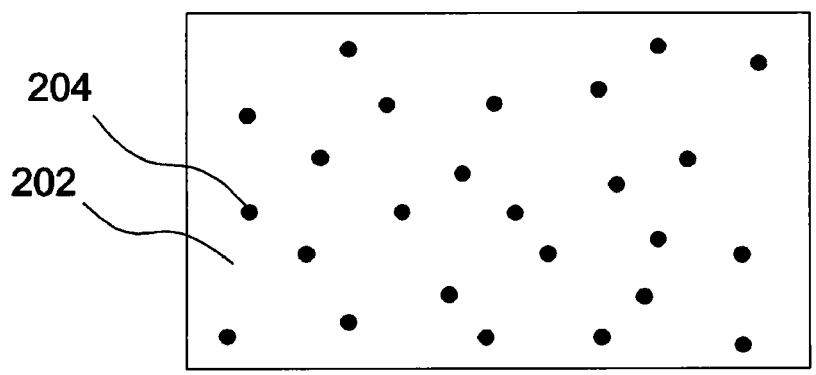
FIG. 2 shows a schematic diagram illustrating another conventional reflective sheet.
Figure 3A:
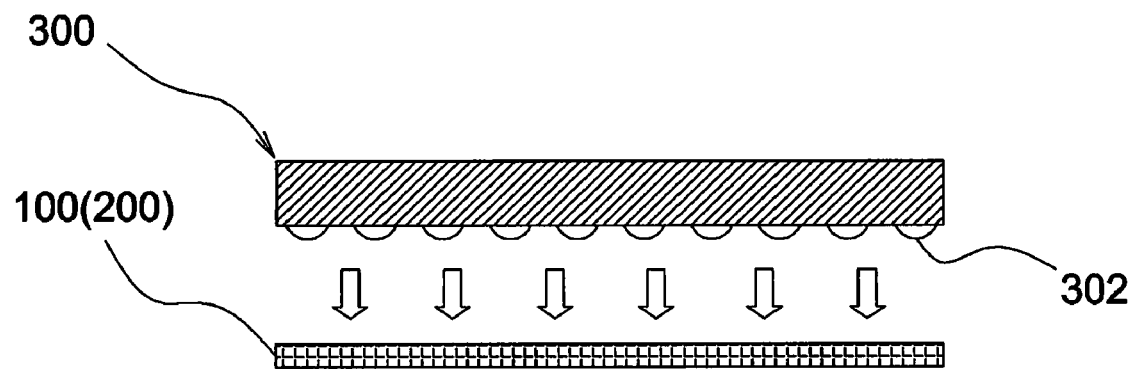
FIG. 3A shows a schematic diagram illustrating the disadvantage of a light guide plate combining with a conventional reflective sheet.
Figure 3B:
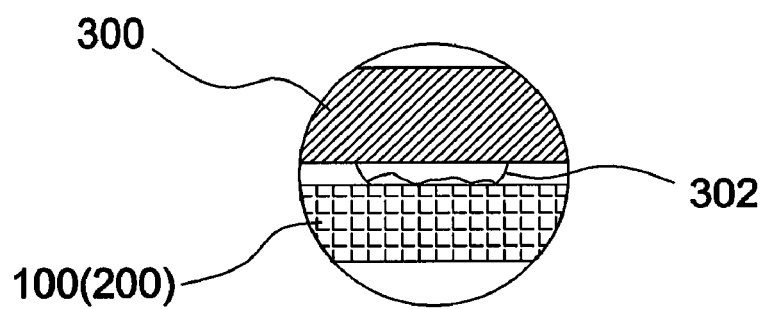
FIG. 3B shows a schematic diagram illustrating a partial enlarged diagram of FIG. 3A.
Figure 4:
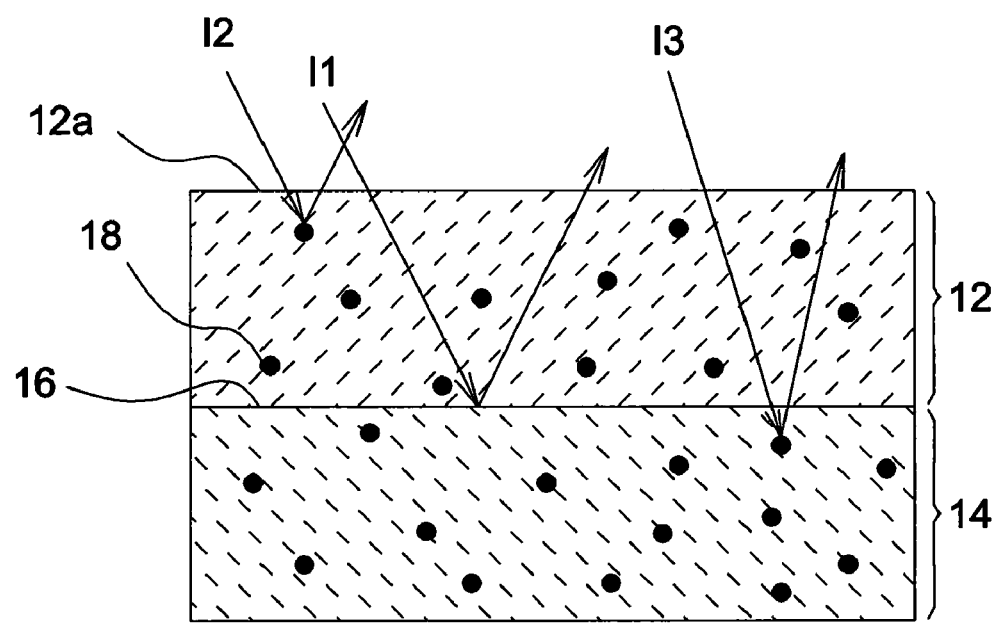
FIG. 4 shows a schematic diagram illustrating a reflective sheet according to an embodiment of the invention.

FIG. 4 shows a schematic diagram illustrating a reflective sheet 10 according to an embodiment of the invention. Referring to FIG. 4, the reflective sheet 10 includes a first reflective layer 12 having a first index of refraction and a second reflective layer 14 having a second index of refraction. The first index of refraction is different from the second index of refraction. The first reflective layer 12 and the second reflective layer 14 are in contact with each other to form a contact interface 16. For example, the first reflective layer 12 and the second reflective layer 14 may be formed and attached to each other by extrusion molding. Since the reflective sheet 10 includes two reflective layers 12 and 14 each having a distinct index of refraction, the contact interface 16 between the two reflective layers 12 and 14 is formed as a reflective surface. Under the circumstance, light beams I1 entering the reflective sheet 10 are allowed to be reflected by the contact interface 16 to increase the overall reflectance of the reflective sheet 10. Compared with the conventional design where a high-cost material such as polyethylene terephthalate is used, a low-cost material (which means low capacity for light reflection) such as polypropylene (PP) or polycarbonate (PC) in this embodiment is allowed to be used instead and achieve good light-reflecting effect, since an additional reflective media (contact interface 16) is provided to increase the overall reflectance of the reflective sheet 10. This considerably reduces the fabrication cost of the reflective sheet 10. Further, in this embodiment, a plurality of reflective particles 18 are added to the first reflective layer 12 and the second reflective layer 14, and a material of the reflective particles 18 may include titanium dioxide (TiO2) or barium sulfate ($BaSO_4$). The reflective particles 18 are allowed to reflect light beams I2 and I3 entering the reflective sheet 10 to further increase the overall reflectance of the reflective sheet 10.

In one embodiment, the light beams incident on the reflective sheet 10 first enter the first reflective layer 12, and the remaining light beams not reflected by the first reflective layer 12 and the contact interface 16 are allowed to enter the second reflective layer 14. Hence, a top surface 12a (opposite the contact interface 16) of the first reflective layer 12 serves as a light incident surface for the reflective sheet 10, the first reflective layer 12 is made from polypropylene (PP), and the second reflective layer 14 is made from polycarbonate (PC). In this embodiment, since the first reflective layer 12 is the reflective layer that the light beams incident on the reflective sheet 10 first encounter, a high-reflectance material such as polypropylene is selected for the first reflective layer 12. In comparison, since the second reflective layer 14 only reflects remaining light beams not reflected by the first reflective layer 12 and the contact interface 16, a low-reflectance material (which means low-cost) such as polycarbonate is selected for the second reflective layer 14 to achieve a compromise between the enhancement of overall reflectance and the reduction of fabrication costs.

Figure 5A:
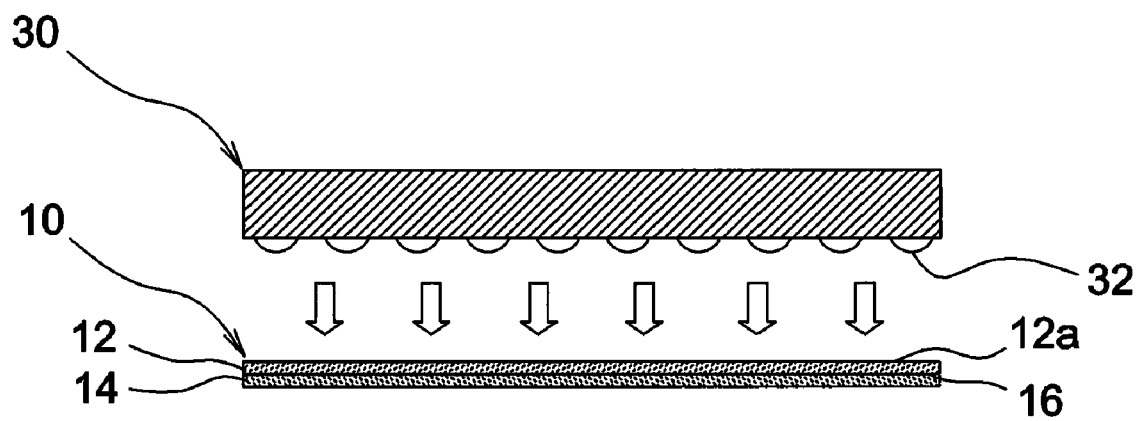
FIG. 5A shows a schematic diagram illustrating the improved effect of a light guide plate combining with a reflective sheet according to an embodiment of the invention.
Figure 5B:
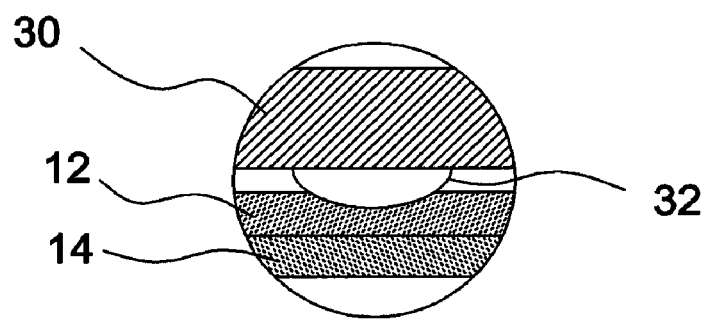
FIG. 5B shows a schematic diagram illustrating a partial enlarged diagram of FIG. 5A.

Besides, as shown in FIG. 5A, when a light guide plate 30 is stacked on the reflective sheet 10 to form a backlight module, a top surface 12a of the first reflective layer 12 opposite the contact interface 16 touches a plurality of light-scattering dots 32 of the light guide plate 30. Since the light beams incident on the reflective sheet 10 enter the first reflective layer 12 first, and the second reflective layer 14 only reflects remaining light beams not reflected by the first reflective layer 12 and the contact interface 16, such characteristic opens up the possibility of providing specific effects according to the choice of fabricated materials. For example, a material having comparatively low mechanical strength such as polypropylene is selected for the first reflective layer 12. Since the material having low mechanical strength is naturally soft, the light-scattering dots 32 made from printed ink are not injured or peeled off due to the squeeze given by the first reflective layer 12 when the light guide plate 30 is stacked on the reflective sheet 10. Thus, each complete light-scattering dot 32 without injury is obtained as shown in FIG. 5B. In comparison, a material having comparatively high mechanical strength is selected for the second reflective layer 14 to enable the reflective sheet 10 to have competent structure strength and thus avoid warp or waiving when the reflective sheet 10 is brought to a standstill or heated. The material selected for the second reflective layer 14 may be polycarbonate having high flexural strength.

In one embodiment, the second reflective layer 14 may be made from an opaque material, so that the reflective sheet 10 is retro-reflective in one side and opaque in the opposite side.

Figure 6:
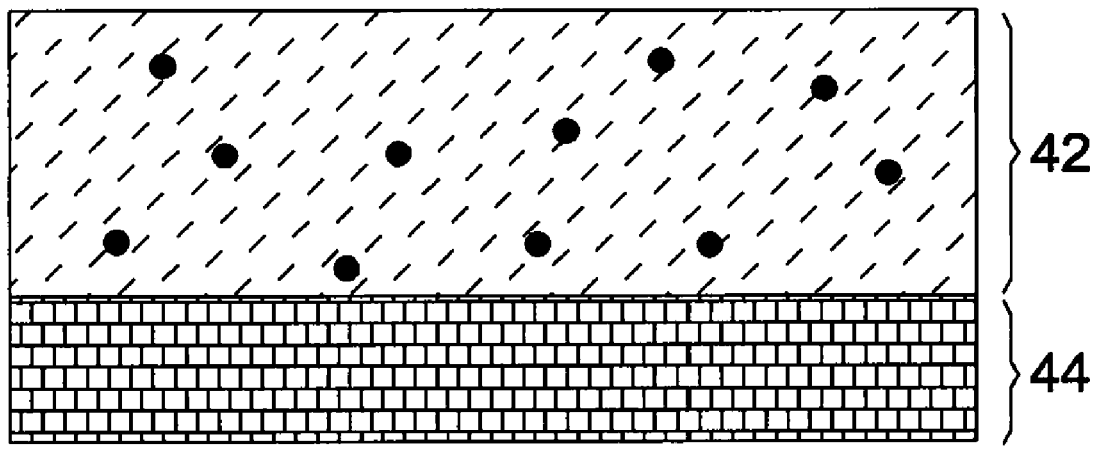
FIG. 6 shows a schematic diagram illustrating a reflective sheet according to another embodiment of the invention.

Further, as shown in FIG. 6, a reflective sheet 40 includes a first reflective layer 42 and a second reflective layer 44, and the second reflective layer 44 may be made from aluminum foil to provide competent structure strength and excellent heat-dissipation capacity.

According to the above embodiments, since two reflective layers having different indexes of refraction or made from different materials are combined to form a reflective sheet, an additional reflective interface is provided to increase the overall reflectance of the complex reflective sheet. Besides, the complex reflective sheet is allowed to provide specific effects, such as reducing fabrication costs or enhancing heat dissipation, according to the choice of fabricated materials for different layers. Further, the disadvantages in a conventional design, such as warp or waving of a reflective sheet and damages on light-scattering dots, are overcome by the above embodiments.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A reflective sheet, comprising:
   a first reflective layer having a first index of refraction; and
   a second reflective layer having a second index of refraction, the first reflective layer and the second reflective layer being in contact with each other to form a contact interface, and the first index of refraction being different from the second index of refraction to make the contact interface be a reflective surface;
   wherein a top surface of the first reflective layer opposite the contact interface serves as a light incident surface for the reflective sheet, the reflectance of the first reflective layer is larger than the reflectance of the second reflective layer, the mechanical strength of the second reflective layer is larger than the mechanical strength of the first reflective layer, the first reflective layer comprises polypropylene and a plurality of reflective particles, the second reflective layer comprises polycarbonate and a plurality of reflective particles, and the reflective particles of the first reflective layer and the reflective particles of the second reflective layer are made of an identical material.

2. The reflective sheet as claimed in claim 1, wherein the flexural strength of the second reflective layer is larger than the flexural strength of the first reflective layer.

3. The reflective sheet as claimed in claim 1, wherein the first reflective layer and the second reflective layer are formed by extrusion molding.

4. The reflective sheet as claimed in claim 1, wherein the material of the reflective particles comprises titanium dioxide or barium sulfate.

5. The reflective sheet as claimed in claim 1, wherein the second reflective layer reflects light beams not reflected by the first reflective layer and the contact interface.

6. A reflective sheet adapted to a backlight module having a light guide plate, the reflective sheet comprising a first reflective layer and a second reflective layer, wherein the first reflective layer comprises polypropylene and a plurality of reflective particles, the second reflective layer comprises polycarbonate and a plurality of reflective particles, the reflective particles of the first reflective layer and the reflective particles of the second reflective layer are made of an identical material, the first reflective layer and the second reflective layer are in contact with each other to form a contact interface, the contact interface is a reflective surface, the second reflective layer reflects light beams not reflected by the first reflective layer and the contact interface, and a top surface of the first reflective layer opposite the contact interface touches a plurality of light-scattering dots of the light guide plate.

7. The reflective sheet as claimed in claim 6, wherein the flexural strength of the second reflective layer is larger than the flexural strength of the first reflective layer.

8. The reflective sheet as claimed in claim 6, wherein the first reflective layer and the second reflective layer are formed by extrusion molding.

9. The reflective sheet as claimed in claim 6, wherein the material of the reflective particles comprises titanium dioxide or barium sulfate.

10. The reflective sheet as claimed in claim 6, wherein the second reflective layer comprises aluminum foil.

11. The reflective sheet as claimed in claim 6, wherein the reflectance of the first reflective layer is larger than the reflectance of the second reflective layer, and the mechanical strength of the second reflective layer is larger than the mechanical strength of the first reflective layer.

* * * * *